United States Patent [19]

Brundage et al.

[11] Patent Number: 4,934,233
[45] Date of Patent: Jun. 19, 1990

[54] COMPOUND MITER SAW

[75] Inventors: Richard B. Brundage; Richard L. Mitchell, both of St. Louis, Mo.

[73] Assignee: Emerson Electric Co., St. Louis, Mo.

[21] Appl. No.: 213,277

[22] Filed: Jun. 29, 1988

[51] Int. Cl.$^5$ .......................... B23D 45/14; B27B 5/20
[52] U.S. Cl. ...................................... 83/397; 83/468.3; 83/468.7; 83/471.3; 83/478; 83/490; 83/581
[58] Field of Search .................... 83/397, 468.3, 468.7, 83/471.3, 473, 477.2, 478, 490, 581

[56] References Cited

U.S. PATENT DOCUMENTS

| 4,002,094 | 1/1977 | Erickson et al. | 83/471.3 |
| 4,343,213 | 8/1982 | Drixler | 83/397 |
| 4,774,866 | 10/1988 | Dehari et al. | 83/397 X |
| 4,799,416 | 1/1989 | Kumasaka et al. | 83/397 |
| 4,805,504 | 2/1989 | Fushiya et al. | 83/397 |

Primary Examiner—Frank T. Yost
Assistant Examiner—Eugenia A. Jones
Attorney, Agent, or Firm—Polster, Polster and Lucchesi

[57] ABSTRACT

In a compound miter saw or the like having a selectively rotatable turntable mounted on a supporting frame and a power driven saw blade pivotally mounted on the turntable between a lowered full cut position and a raised full retract position, the improvements comprising a work supporting fence that is maintained in alignment with a turntable slot while the turntable, including associated saw blade slot, is positioned for desired miter cuts; and the work supporting fence also being accurately and effectively clamped relative to the supporting frame, in both front and rear work supporting fence positions. Additional improvements include a swinging blade guard for the power driven saw blade having a pivot center eccentrically offset upwards from the shaft on which the saw blade rotates and back toward the pivotal mounting of the saw on the turntable, to facilitate access to the saw blade shaft and precludes interference with bevel cuts; and first and second transversely extending closed cylinders between the turntable and the saw, enabling pivotal movement of the saw between full cut and full retract positions, while also permitting bevel pivotal adjustment of the saw relative to the turntable.

28 Claims, 7 Drawing Sheets

COMPOUND MITER SAW

BACKGROUND OF THE INVENTION

The present invention relatives to compound miter saws or the like, and more particularly, to improvements in compound miter saws relating to the work supporting fence and its mounting/position relative to an associated miter adjustable turntable, as well as to the mounting of a swinging blade guard relative to the saw, to facilitate access to the shaft on which the saw blade rotates, and closed cylinders for the saw enabling pivotal movement and bevel adjustment of the saw relative to the turntable.

Miter and bevel cutting of wood, metals, and plastics is required in a variety of industries. In the construction industry, for example, moldings, door frames, window frames, chair rail and the like must be miter cut at corners. In addition to the diagonal or miter cut, a combined miter/bevel cut is required in certain instances for the proper fitting of cut parts. As will be appreciated, residential construction requires a relatively large number of such cuts.

At the present time, both hand miter boxes and powered miter saws have been developed to assist in making miter and bevel cuts. Powered miter saws have replaced hand miter boxes in some cases because the powered miter saws permit miter and bevel cuts to be more quickly and easily made then with the use of the hand miter box. In order to facilitate its use around a construction site, for example, the powered miter saw must be portable, easy to use, sturdy in construction and relatively economical, allowing individual workman to purchase and obtain their own powered miter saw.

Some examples of powered miter saws include U.S. Pat. No. 4,011,782 where a powered miter saw is pivotally mounted between an upper at rest position and a lower operational position, and includes saw mounting and locking means to normally bias the saw in an upper at rest position, but permitting the saw to be locked in a down position, as well as detent and locking means for a turntable to permit one-handed miter adjustment; U.S. Pat. No. 4,452,117 where a powered miter saw is mounted for movement on a pair of spaced parallel guide rods supported by a frame, together with spaced work supporting fences which retain their position while a miter turntable is selectably moved; U.S. Pat. No. 4,581,966 in which a powered miter saw has a swinging blade guard that covers an exposed segment of the saw blade when the saw is in an at rest position, including a linkage system that both exposes the saw blade when lowered, as well as enables the linkage system to be temporarily reduced, facilitating access to the saw blade for changing the same; and U.S. Pat. No. 4,638,700 in which a portable miter saw has a mechanism interlocked with the turntable for saw blade clearance gap in the work supporting fence.

While all of the aforementioned examples have worked well for their intended purpose, there are several noticeable deficiencies which have not been solved by prior art designs. One area of deficiency relates to the manner in which the work supporting fence is located and supported relative to the work table, causing loss of capacity or inaccurate and ineffective clamping of the work supporting fence relative to the work table. Another area of deficiency relates to the movement of the turn table for miter cuts, while maintaining a predetermined and favorable position for the work supporting fence. A still further area of deficiency relates to the manner in which a swinging blade guard is removed to permit access to the shaft on which the saw blade rotates, without expensive and complicated arrangements. Finally, the pivoting of the saw and the bevel adjustment of the saw relative to the turntable have not provided accurate adjustment in a long lasting and durable construction.

SUMMARY OF THE INVENTION

Among the several objects and the advantages of the present invention:

the provision of a compound miter saw or the like which overcomes all of the aforenoted deficiencies of the prior art;

the provision of the aforementioned compound miter saw or the like which provides accurate and efficient clamping of the work supporting fence relative to a supporting frame, in either front or rear fence positions for work pieces of different sizes;

the provision of the aforementioned compound miter saw or the like which is maintained in alignment relative to a turntable with an inclusive saw blade slot while the turntable is positioned relative to a powered pivoting saw blade for desired miter cuts;

the provision of the aforementioned compound miter saw or the like that facilitates access to the saw blade shaft by a swinging blade guard that is eccentrically offset upwards from the saw blade shaft and backwards toward the mounting of the saw, to facilitate easy access to the saw blade shaft, for changing the saw blade;

the provision of the aforementioned compound miter saw or the like which permits both pivotal and bevel adjustment by closed cylinders extending between the saw and the supporting frame for the saw; and the provision of the aforementioned compound miter saw or the like which is portable; easy and practical to use and operate; simple and inexpensive to maintain and repair; extremely durable and long lasting in construction; relatively inexpensive permitting individual purchase and ownership thereof; and otherwise is well adapted for the purposes intended.

The present invention provides improvements in a compound miter saw or the like having a supporting frame, a turntable selectively rotatably mounted on the supporting frame, a power driven saw blade pivotally mounted on the turntable for movement along a vertical path relative to the turntable, the turntable also having saw blade slot means for receiving the saw blade therein, wherein the improvements comprise: a work supporting fence mounted on the supporting frame and including a pair of work supporting surfaces longitudinally aligned across the saw blade slot means, the work supporting fence including a depending arm extending through the saw blade slot means and being received within an elongated opening in an index spring, to enable the work supporting fence to be moved into alignment relative to the turntable as the depending arm of the work supporting fence moves within the elongated opening of the index spring.

A further improvement includes having first angularly offset surfaces for the work supporting fence on each side of the saw blade slot means which are aligned in generally parallel relationship with second angularly offset surfaces provided in the supporting frame, and having clamping means for clamping the first angularly offset surfaces of the work supporting fence relative to the second angularly offset surfaces of the supporting frame.

Further improvements include a swinging blade guard, arranged to cover an exposed area on the saw blade when in at rest position, wherein the pivot center for the swinging blade guard on an associated housing is eccentrically offset upwards from a saw blade shaft of the compound miter saw and is also eccentrically offset back towards the pivotal mounting of the compound miter saw.

Another improvement for the compound miter saw includes first and second transversely offset closed cylinders extending between the supporting frame and the saw, the first closed cylinder including means for pivot movement between the operational and at rest positions, and the second closed cylinder including means for bevel pivotal adjustment of the saw relative to the turntable.

Other and further objects and advantages of the present invention will become apparent from the ensuing description.

BRIEF DESCRIPTION OF THE DRAWINGS

Corresponding reference numerals will be used throughout the various figures of the drawings.

BRIEF DESCRIPTION OF THE PREFERRED EMBODIMENT

Figure 1:
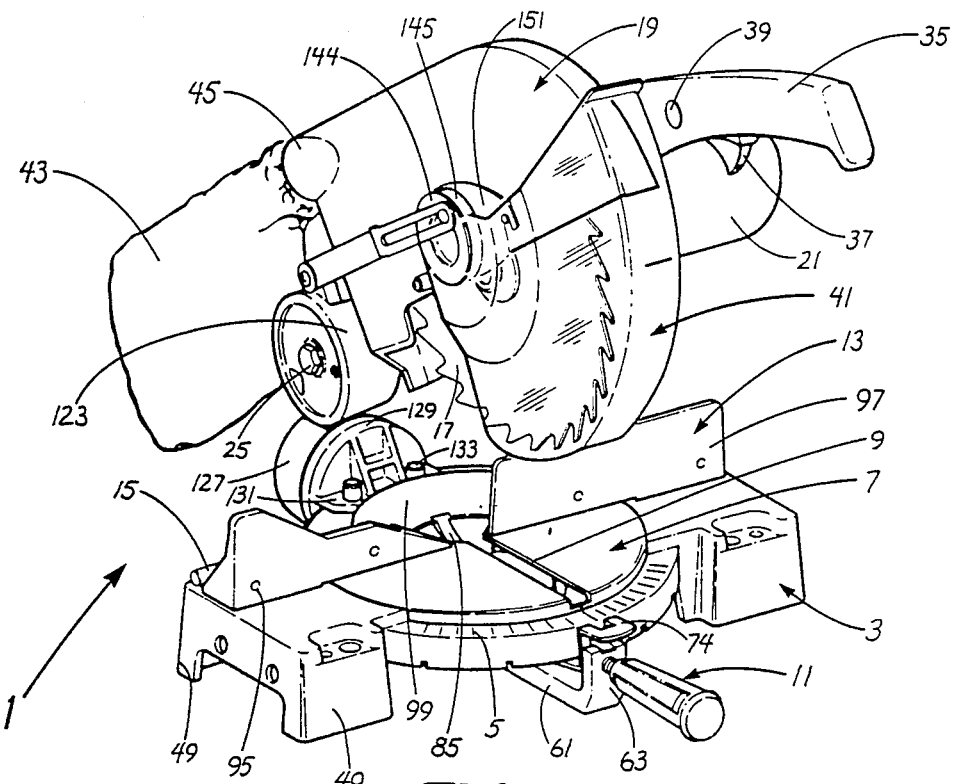
FIG. 1 is a front perspective view of a compound miter saw which is constructed in accordance with the teachings of the present invention.

Before discussing the specific improvements of the present invention in compound miter saws or the like, reference is first made to FIGS. 1-4 of the drawings for an overview and description of the principal components of the compound miter saw, and the manner in which they cooperate together to achieve the desired miter/bevel cuts in workpieces. As illustrated, the compound miter saw 1 includes a supporting base or frame 3 having an arcuate miter scale 5 attached at an upper, front position thereof for ease of use and visibility by the user. A turntable 7 is selectively rotatably mounted within the supporting frame or base 3 and is provided with a saw blade slot 9 therein. A miter lock handle 11 is constructed to selectively rotate the turntable 7 relative to the supporting frame 3 in order to position the turntable 7 in the desired bevel setting, as shown on the bevel scale 5.

Figure 3:
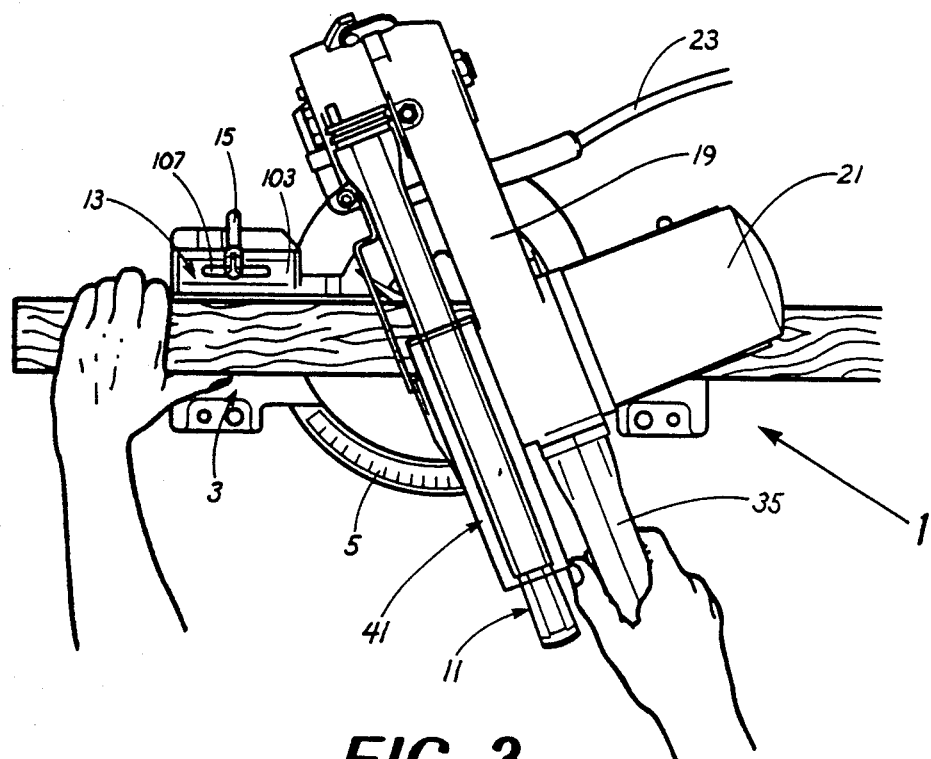
FIG. 3 is a top plan view of the compound miter saw of the present invention illustrating the manner in which miter cuts are made in workpieces.
Figure 4:
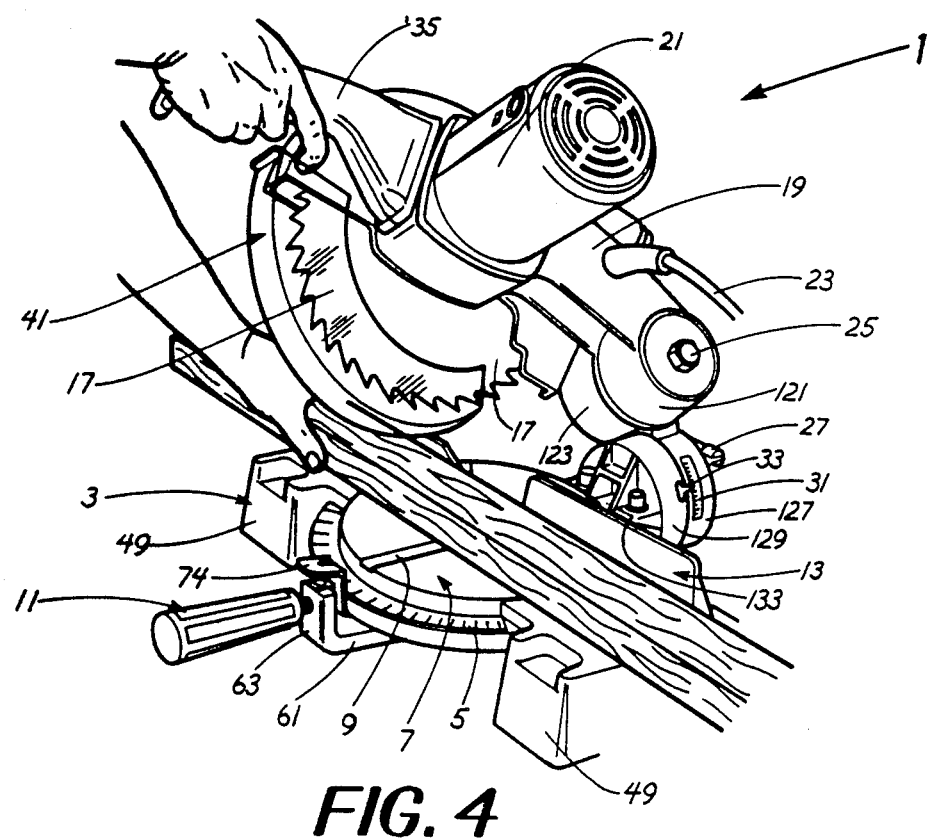
FIG. 4 is a front perspective view of the compound miter saw of the present invention illustrating the ability of the saw to perform bevel cuts in workpieces.

In order to hold and support workpieces, as shown in FIGS. 3-4 in accurate aligned and squared position in the compound miter saw 1, a work supporting fence 13 is provided. The work supporting fence 13 has fence lock handles 15 enabling the work supporting fence to be mounted in front and rear positions to accommodate work pieces of different size, for example, 2×4's in the front fence position and 2×6's in the rear fence position.

A miter saw blade 17 is rotatably mounted within the upper blade guard and housing 19 and is power driven by an electric motor 21 mounted to the upper blade guard and housing 19. Suitable power is available to the electric motor 21 via the power cord 23. The upper blade guard and housing 19 is pivotally mounted relative to the supporting frame or base 3 at 25, through uniquely designed closed cylinders as will be discussed hereinafter.

Figure 2:
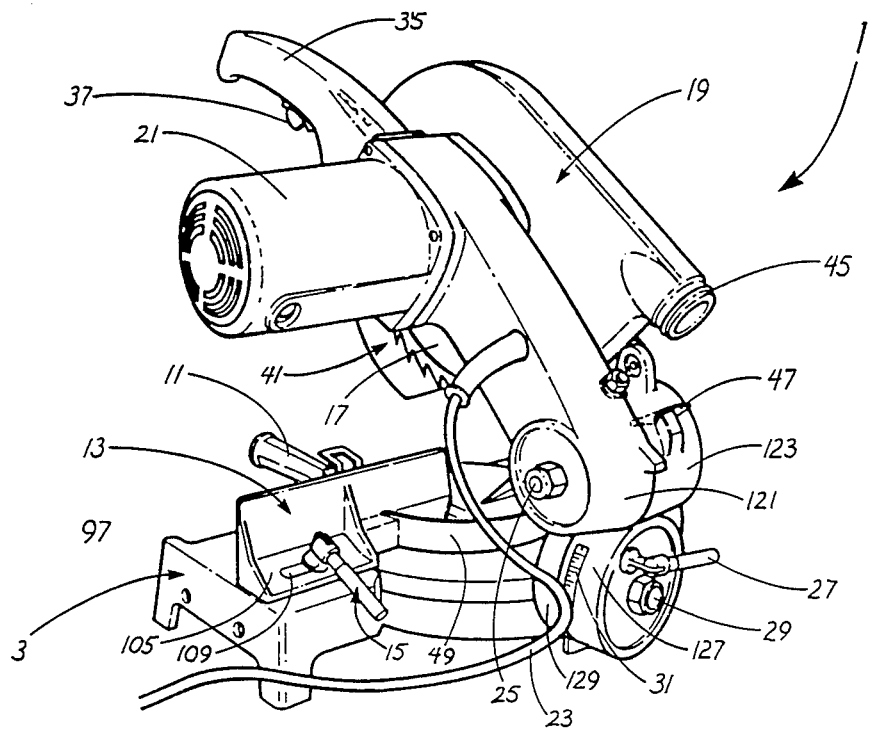
FIG. 2 is a rear perspective view of the compound miter saw of the present invention.

The miter cutting of workpieces, by moving the turntable 7 via the miter lock handle 11, is best illustrated in FIG. 3 of the drawings. FIG. 4 of the drawings also shows how the compound miter saw 1 can be utilized to make bevel cuts in workpieces. The bevel adjustment for the compound miter saw, as seen in FIG. 2 and 4 of the drawings, includes a bevel lock handle 27 which may be loosened to allow the entire upper blade guard and housing 19, including components associated therewith, to be pivotally moved along pivot axis 29, to the desired bevel angle, as determined by the bevel scale 31 and fixed pointer 33 on adjacent fixed and moving cylinders, as will be described. For raising and lowering the miter saw blade 17 about the pivot axis 25, a miter saw handle 35 with associated trigger switch 37 that energizes the motor 21 is provided. As is well known, a suitable lock-button 39 may be provided to prevent actuation of the trigger switch 37, if desired. In order to provide added protection to the user from the miter saw blade 17 when the compound miter saw is at an upper at rest position, as seen in FIGS. 1-2 of the drawings, a swinging lower blade guard 41 is provided. The swinging lower blade guard 41 is preferably made from transparent plastic material to facilitate visibility of the miter saw blade 17 by the user. As will be described hereinafter, the construction of the swinging lower blade guard 41 relative to the upper blade guard and housing 19 facilitates access to the shaft of the miter saw blade 17, to facilitate changing of the blades, as may be desired, and does not interfere with bevel cuts.

For collecting dust and other debris generated from cut work pieces, a dust bag 43 is attached to an exhaust outlet 45 at the rear of the upper blade guard housing 19. For compact shipment, the swinging lower blade guard is partially disconnected, and a handle latch 47, when in the dotted line position shown in FIG. 2 of the drawings, holds the upper blade guard and housing 19 in a lower position for shipment. When moved its full line position as shown in FIG. 2 of the drawings, the handle latch 47 becomes inoperative, allowing the upper blade guard and housing 19 to be pivotally mounted about the pivot axis 25 for normal operation of the compound miter saw.

In light of the general understanding of the compound miter saw 1 from the above description, reference is now made to FIGS. 1–5 and 7–11 of the drawings for a specific description of the improvements which have been incorporated into the turntable and work supporting fence of the present invention. As best seen in the exploded view of FIG. 11, the supporting frame or base 3 is a one-piece cast iron section having spaced pairs of depending legs 49, 49 which support the frame 3 on a horizontal surface. If desired, the supporting frame 3 may be attached to a plywood mounting board, and for this purpose, suitable mounting bolts (not shown) are positioned through the mounting bolt apertures 51 in order to mount and secure the supporting frame 3 to a plywood mounting board or the like. Within the spaced pairs of depending supporting legs 49, 49, the supporting frame 3 includes an integral upstanding circular-shaped wall 53, and a webbed bottom wall 55 having a through opening 57 centrally positioned relative to the upstanding annular or circular-shaped upstanding wall 53. A turntable 7 is designed to be received by the supporting frame 3, and as can be seen, the turntable 7 is complementary shaped for receipt within the upstanding annular or circular wall 53 of the supporting frame 3. In addition, the turntable 7 is provided with a complementary shaped circumferentially extending depending flange 59 (see FIGS. 9–10) which is rotatably received within the centrally positioned through opening 57 of the supporting frame 3. Thus, the turntable 7 and associated saw blade slot 9 are capable of being rotatably positioned relative to the supporting frame 3 and miter scale 5.

Figure 9:
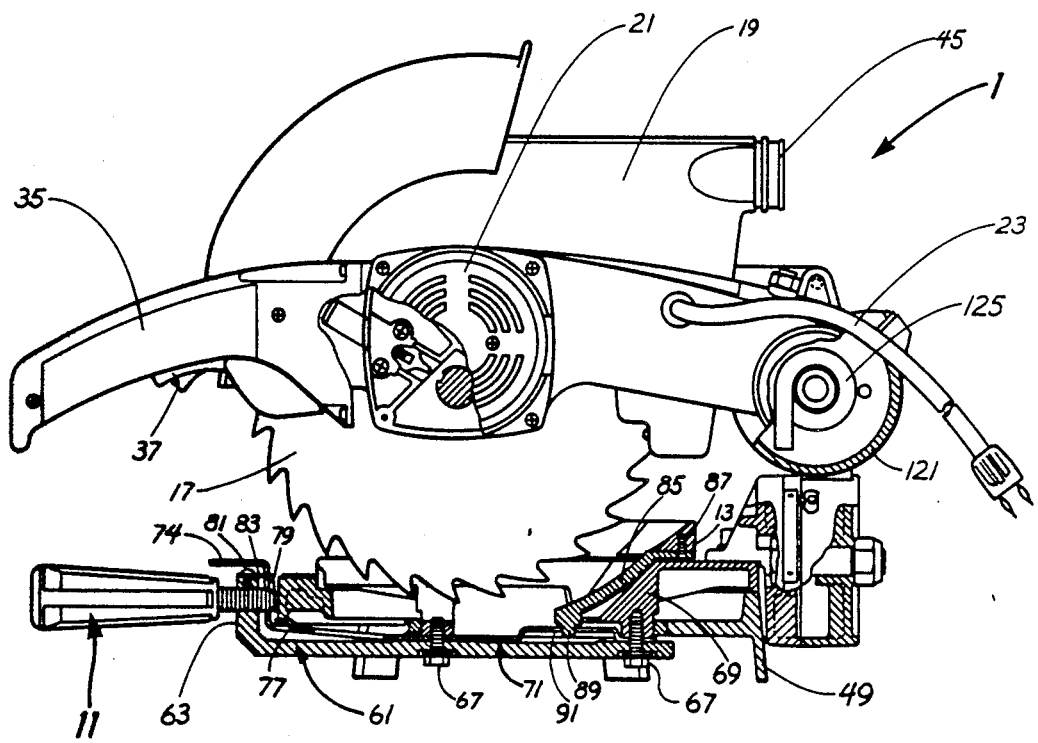
FIG. 9 is a right side elevational view, partly in section, of the compound miter saw of the present invention.
Figure 10:
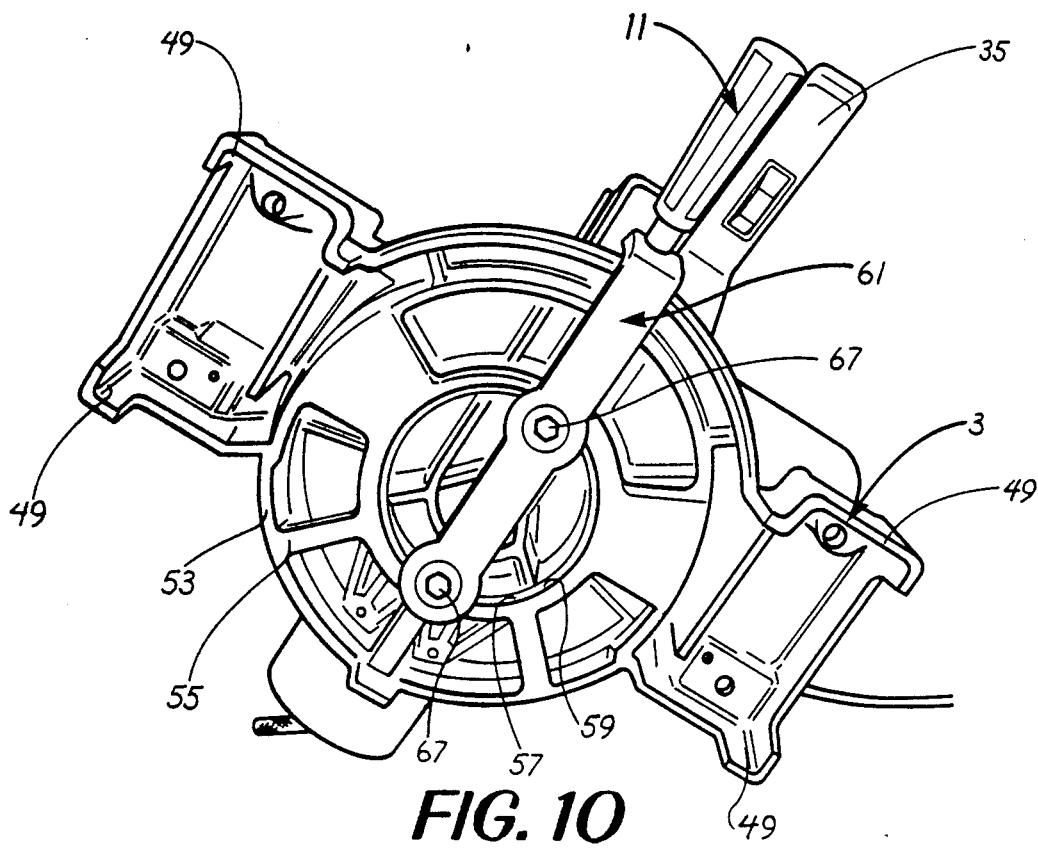
FIG. 10 is a bottom perspective view of the compound miter saw of the present invention.
Figure 11:
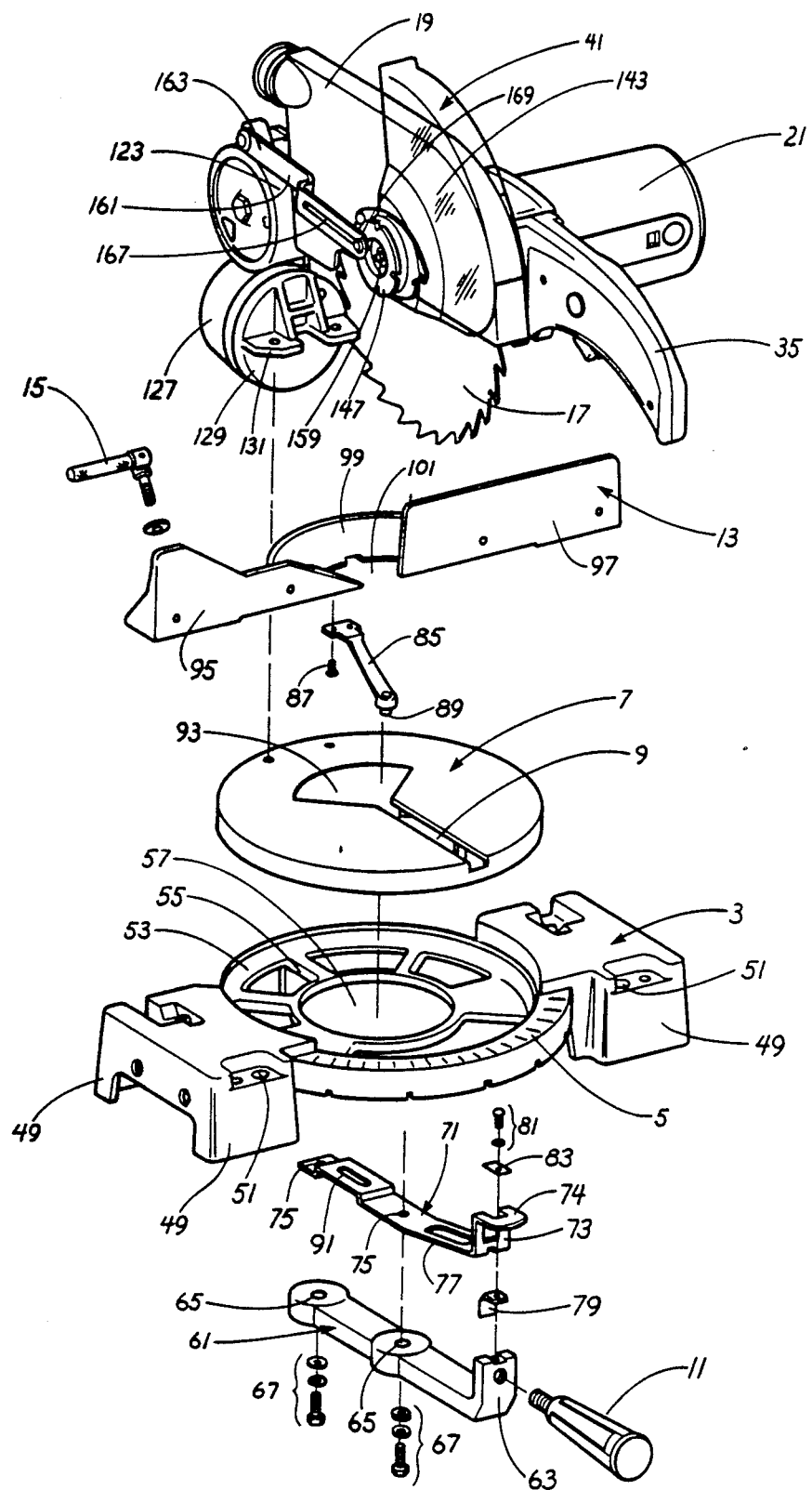
FIG. 11 is an exploded perspective view of the turntable and related components associated with the compound miter saw of the present invention.

For moving the turntable 7, a miter lock handle 11 is provided. A handle extension 61 having a generally vertically extending section 63 is provided with a threaded opening for receiving the miter lock handle 11. Within the handle extension 61 are spaced bolt receiving apertures 65 for receiving the bolt and other components 67 as shown in FIG. 11 of the drawings. The bolts 67 are received within internal bosses 69 of the webbed bottom wall 55 of the supporting frame 3, as best seen in FIGS. 9–10 of the drawings. An index spring 71 which is generally complementary shape relative to the handle extension 61 is superimposed above the handle extension 61 and is captured between the handle extension 61 and the under surface of the webbed bottom wall 55 of the supporting frame 3. At one end of the index spring 71 is a generally vertically extending section 73 which corresponds to the generally vertically extending portion 63 of the handle extension 61. A finger engaging section 74 extends generally horizontally and laterally outwardly from the generally vertically extending section 73, for purposes soon to be described. The index spring is provided with spaced apertures 75 which are correspondingly spaced the same distance as the bolt apertures 65 for receiving bolt 67 therein as a result, the index spring 71 is mounted between the handle extension 61 and the outside surface of the webbed bottom wall 55.

Figure 5:
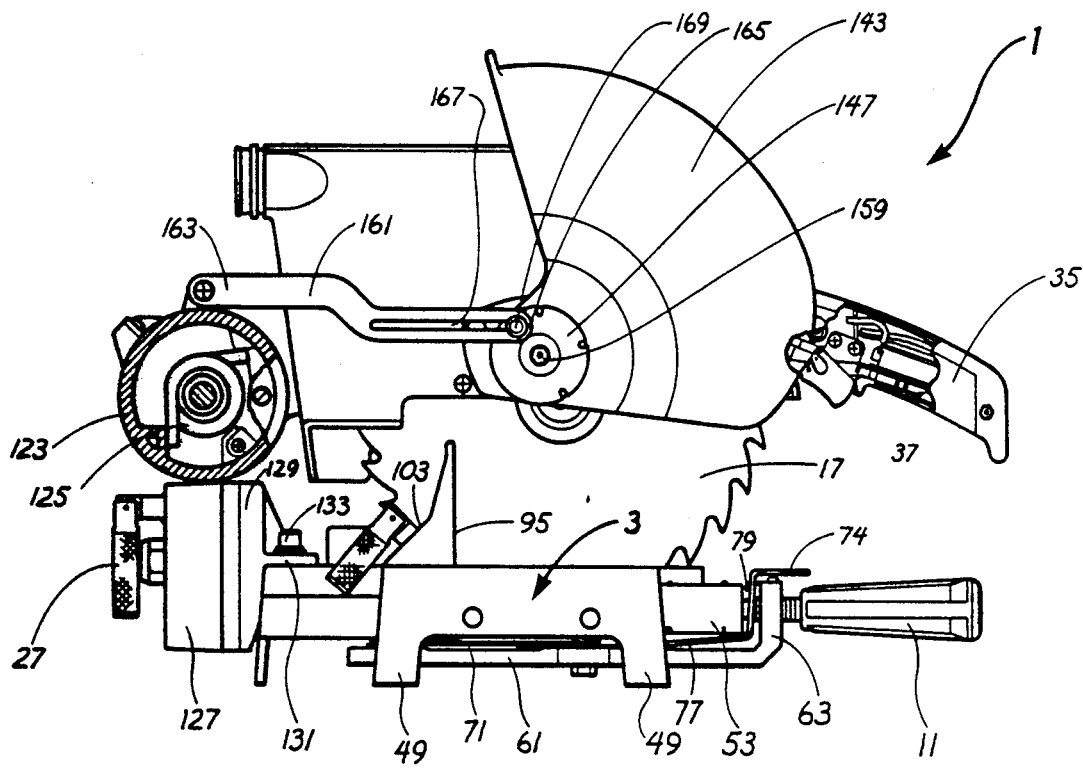
FIG. 5 is a side elevational view, partly in section, of the compound miter saw of the present invention.

It will be noted that the index spring 71 is angularly and upwardly offset at 77 from the handle extension 61 so as to peripherally engage an undersurface of the webbed bottom wall 55 as best seen in FIGS. 1, 5 and 9 of the drawings. Thus, the index spring 71 is normally biased at 77 into contact with the supporting frame 3 along a peripheral undersurface of the webbed bottom wall 55. In order to release the index spring 71 and associated normally biased engaging portion 77 thereof from the peripheral undersurface of the webbed bottom wall 55, the spring release latch 74 is provided, enabling the user to depress the spring latch to lower the section 77 out of peripheral engagement with the under surface of the webbed bottom wall 55. This enables the outer lock handle 11 to move the handle extension 61 and associated index spring 71 relative to the supporting frame 3 to any desired bevel angle as shown by the bevel scale 5 on the supporting frame 3. At the desired bevel location, the miter lock handle 11 is threadably rotated into engagement with depending flat spring 79, attached by the fastener components 81 to the generally vertically extending section 63 of the handle extension 61. When the depending flat spring 79 is engaged by the rounded end, adjacent the threaded section of the miter lock handle 11, the depending flat spring 79 is trapped between the miter lock handle 11 and the outer peripheral surface of the upstanding annular or circular wall 53 of the supporting frame, to apply a resilient biasing force relative to the miter lock handle 11 so as to resist unauthorized loosening or retrograde movement thereof. The fastener components 81 also clamp a flat washer 83 to the upstanding section 63 of the handle extension 61, the flat washer 83 carrying a pointer thereon for accurate alignment and positioning of the turntable 7 and associated miter lock handle 11 relative to the miter scale 5 of the supporting frame 3, as will be appreciated.

When the miter lock handle 11 is loosened to enable the turntable 7 to be positioned in a desired miter location, the associated saw blade slot 9 will also be positioned at the desired miter angle. The work supporting fence 13, on the other hand, is fixed to the supporting frame 3, in a manner shortly to be described. Therefore, in order to provide coordinated automatic positioning of the turntable 7 and saw blade slot 9 relative to the fixed work supporting fence 13, a depending arm 85 is attached to the work supporting fence 13 by suitable fasteners 87 at one end. The depending arm 85 angularly extends downwardly therefrom and terminates at the other end in a generally vertically extending annular boss 89 which is received within the elongated slot 91 of the index spring 71, as best seen in FIGS. 9 and 11. Thus, as the miter lock handle 11 and associated turntable 7 with saw blade slot 9, is positioned at various bevel angles, the annular boss 89 of the depending arm 85 is slidably received within the elongated slot 91 to maintain the work supporting fence 13 in an accurately fixed position relative to various miter positions of the turntable 7.

It will also be noted that the elongated slot 9 of the turntable 7 opens up into a fanned-shaped or other configured opening 93 for purposes now to be described. As the turntable 7 and pivoting miter saw blade 17 are jointly moved together during miter adjustment, the elongated slot 9 is maintained in alignment with the miter saw blade 17, as discussed above. However, because the work supporting fence 13 moves as the turntable 7 and saw blade 17 mounted thereon rotates, the saw blade 17 will be maintained in alignment relative to the saw blade slot 9 and fence 13. The work supporting fence 13 is formed into a spaced pair of work engaging elements 95, 97 which are longitudinally aligned relative to one another across the saw blade slot 9. Connecting the aligned pair of work engaging elements 95, 97 is an arcuately-shaped intermediate element 99 also having a fan-shaped opening 101 which is complementary to and generally vertically aligned with the fan-shaped opening 93 associated with the saw blade slot 9 of the turntable 7. Thus, during pivotal adjustment of the turntable 7 and miter saw blade 17 mounted thereon relative to the supporting frame 3 for pivotal adjustment thereof, the miter saw blade 17 in the area of the work supporting fence 13 is received within the fan-shaped aligned openings 93, 99 of the turntable and work supporting fence 7, 13 respectively, so as to avoid any interference therewith. The depending arm 85 of the work supporting fence 13 is attached to an undersurface of the intermediate arcuately shaped element 99, and the annular boss 89 at its lower end is slidably received within the elongated slot 91, in order to allow the work supporting fence 13 to move as the turntable 7 and miter saw blade 17 are rotated to the miter adjustment desired.

Another improvement in the compound miter saw 1 relates to the improved accuracy in clamping the work supporting fence 13 relative to the supporting frame 3 and the resistance to external forces which would tend to tip the work supporting fence 13. Specifically, and with reference to FIGS. 2–3, 5 and 7–8 of the drawings, it will be seen that each of the work engaging elements 95, 97 are provided with angularly offset surfaces 103 for the work engaging element 95 and angularly offset surface 105 for the work engaging element 97. Each of the angularly offset surfaces 103, 105 are preferably offset 30° from the bottom surface of the work supporting fence 13, which rests upon the upper or top surface of the supporting frame 3. An elongated slot 107 is provided in the angularly offset surface 103 and a elongated slot 109 is provided in the angularly offset surface 105 for receiving the side fence lock handle 15, 15. The elongated slots 107 and 109 take up front and back play of the fence 13, while allowing handle clearance.

Figure 7:
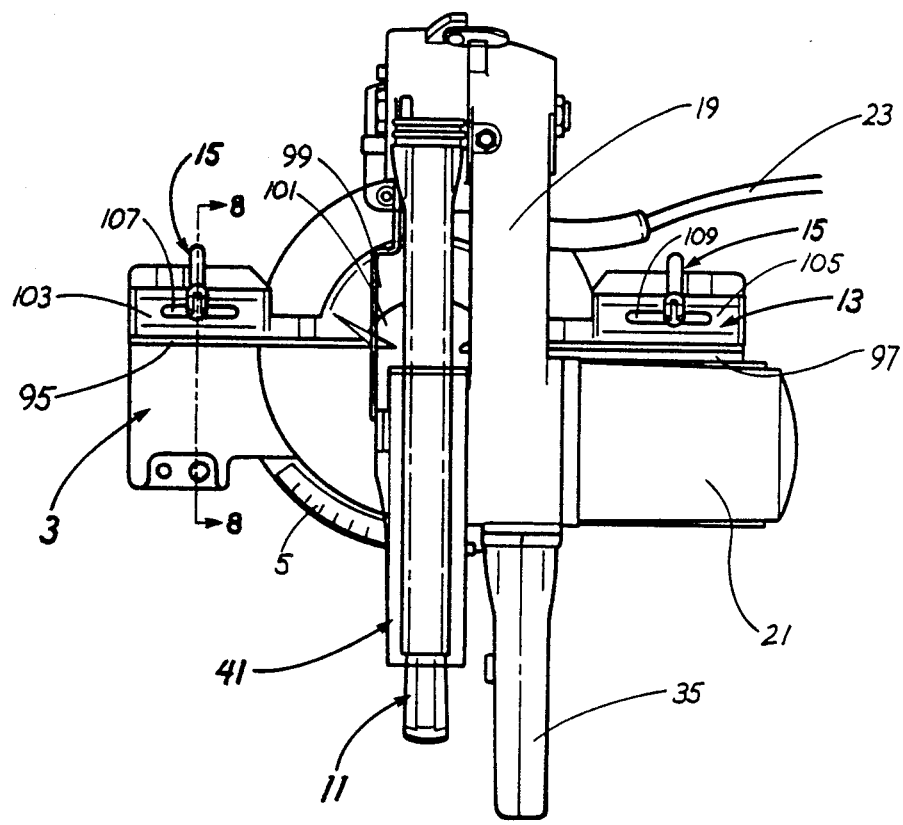
FIG. 7 is a top plan view of the compound miter saw similar to the top plan view of FIG. 3, but illustrating the work supporting fence in a rear fence position.
Figure 8:
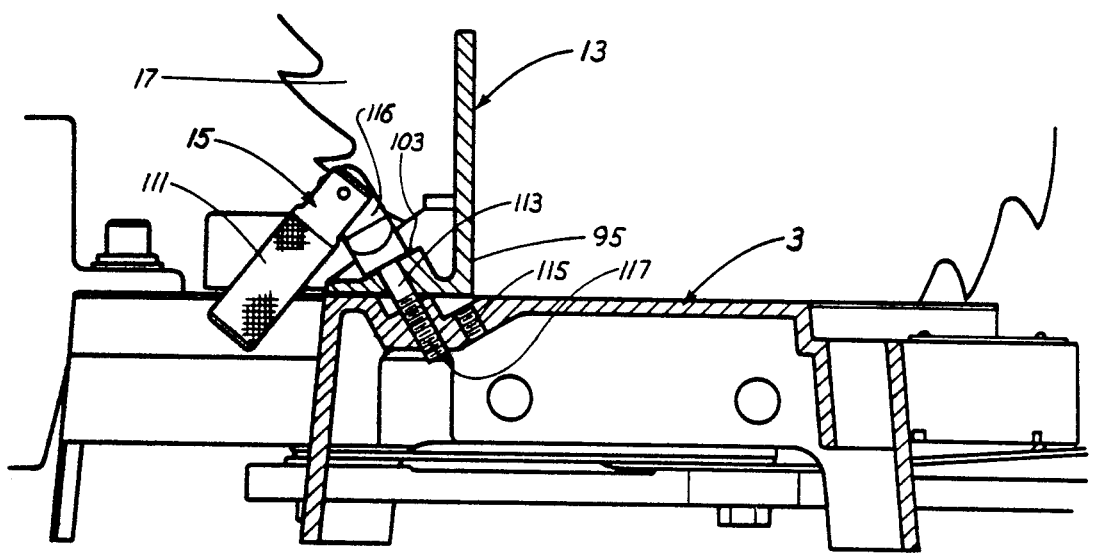
FIG. 8 is an enlarged fragmentary side elevational view, partly in section illustrating the manner in which the work supporting fence is clamped relative to the supporting frame, in either front or rear work supporting fence positions.

Each of the work supporting fence lock handles 15 has a pivoting finger gripping rod section 111 having an outer knurled surface and a threaded section 113, with an intermediate head or clamping area 116 therebetween. As explained above, the work supporting fence 13 has both rear and front positions. As shown in FIG. 8 of the drawings, the supporting frame 3, as viewed along line 8—8 of FIG. 7, is provided with front and rear threaded opening 115, 117 which are complementary threaded relative to the threaded male stud 113 of each of the work supporting fence lock handles 15. It will also be noted that each of the front and rear threaded openings 115, 117 in the supporting frame 3 are angularly offset, also preferably at 30° from the top or upper surface of the supporting frame 3. Thus, as the work supporting fence lock handles 15 are threaded via the threaded male studs 113 into either of the front or rear threaded openings 115, 117, the head or clamping area 116 of the work supporting fence lock handles 15 will engage the angularly offset surface 103 or 105 and thus apply clamping pressure through the angularly offset surfaces 103, 105, as the work supporting fence lock handles 15 take up slack in the elongated slots 107, 109 and clamp the work supporting fence 15 relative to the supporting frame 3. It will also be apparent that the aforementioned angularly offset components, which provide angularly offset clamping pressure, through the angularly offset surface 103 of the work engaging element 95 and the angularly offset surface 105 of the work engaging element 97, will aid in resisting external forces which would tend to tip the work supporting fence 13.

The front position of the work supporting fence is shown in FIG. 3 of the drawings where a 2×4 is engaged by the work supporting fence 13 and the compound miter saw 1. In the front fence position, the plane of the work supporting fence 13 and element 89 are located approximately at the center of the turntable 7 and the fence is fixed in place. The rear fence position is shown in FIG. 7 of the drawings, where the work supporting fence 13 has been moved rearward to accommodate a 2×6 for cutting thereof In the rear fence position, the fence 13 is offset from the center of the turntable 7. The rear fence position is designed to slide side-to-side, with the work supporting fence lock handles 15 loosened, when the miter setting is changed. This feature lets the work supporting fence 13 move to provide maximum support for the workpiece. When the desired miter setting is reached, the work supporting fence lock handles 15 are tightened to again clamp the work supporting fence 13 relative to the supporting frame 3.

Still another improvement of the present invention in the compound miter saw 1 relates to the pivotal mounting of the compound miter saw 1 on the turntable 7 and the combined bevel adjustment construction associated therewith, as best seen in FIGS. 1–5 and 9 of the drawings. As previously explained, the upper blade guard and housing 19 carry the motor 21, saw blade 17, swingable blade guard 41 and related components are pivotally mounted along pivot axis 25, while the upper blade guard and housing 19, miter saw blade 17 and related components are pivotally moved about pivot axis 29 for bevel adjustment of the compound miter saw.

The pivot axis 25 comprises a pivot bolt 25 which extends through a cylindrically shaped section 121 for the upper blade guard and arm or housing 19 and is complementary shaped relative to an interfitting and mirror image cylindrical section 123. Between these two cylindrical sections 121, 123 which is confined a torsional spring 125 for normally urging the upper blade guard 19 and miter saw blade 17 in the upper at rest position. When the handle 35 of the compound miter saw 1 is depressed to lower the miter saw blade 17, the cylindrically shaped section 121, integral with the upper blade guard and housing 19, will rotate relative to the complementary and mirror image shaped cylindrical section 123 on the pivot bolt 25, to allow the miter saw blade 17 to be moved into an operational position. When the handle 35 of the compound miter saw is released, the torsional spring 125 will again cause the cylindrical section 121 to pivot about the pivot bolt 25 relative to the corresponding cylindrically shaped section 123, but in a reverse direction, as will be understood.

Integrally attached to the cylindrically shaped section 123 is a transversely extending cylindrically shaped section 127 that extends therebelow. The cylindrically shaped section 127 is attached via the pivot bolt 29 to a smaller, but complementary shaped cylindrical section 129, the later being fixedly mounted to the turntable 7. Specifically, the smaller, but complementary shaped cylindrical section 129 is provided with a radially outwardly extending flange section 131 which is clamped to the turntable 7 by the clamping bolts 133. A bevel lock handle 27 extends through the cylindrical section 127 and engages the corresponding cylindrical section 129 to limit relative rotational movement thereof along the pivot bolt axis 29. When the bevel lock handle 27 is loosened, the cylindrical section 127, containing the bevel scale 131, may be rotated relative to the corresponding cylindrical section 129, fixedly mounted to the turntable 7, enabling the upper blade guard and housing 19, miter saw blade 17 and related components to assume a different compound or bevel adjustment, as may be desired.

It will be seen that the fixed cylinder section 123 of the first closed cylinder comprising the cylindrical sections 121 and 123 containing the torsional spring 125, during pivotal movement of the saw between operational and at rest positions, is integrally joined to the moving cylinder section 127 of the second closed cylinder comprising the cylinder sections 127, 129, during bevel pivotal adjustment of the saw relative to the turntable 7. Not only is the closed cylinder construction, of the first and second cylinders described above, unique, but the construction is substantially more durable and rigid than other prior designs. In addition, the bevel scale 131 is more accurate by virtue of being mounted on a controlled radius of a cylinder 127.

Figure 12:
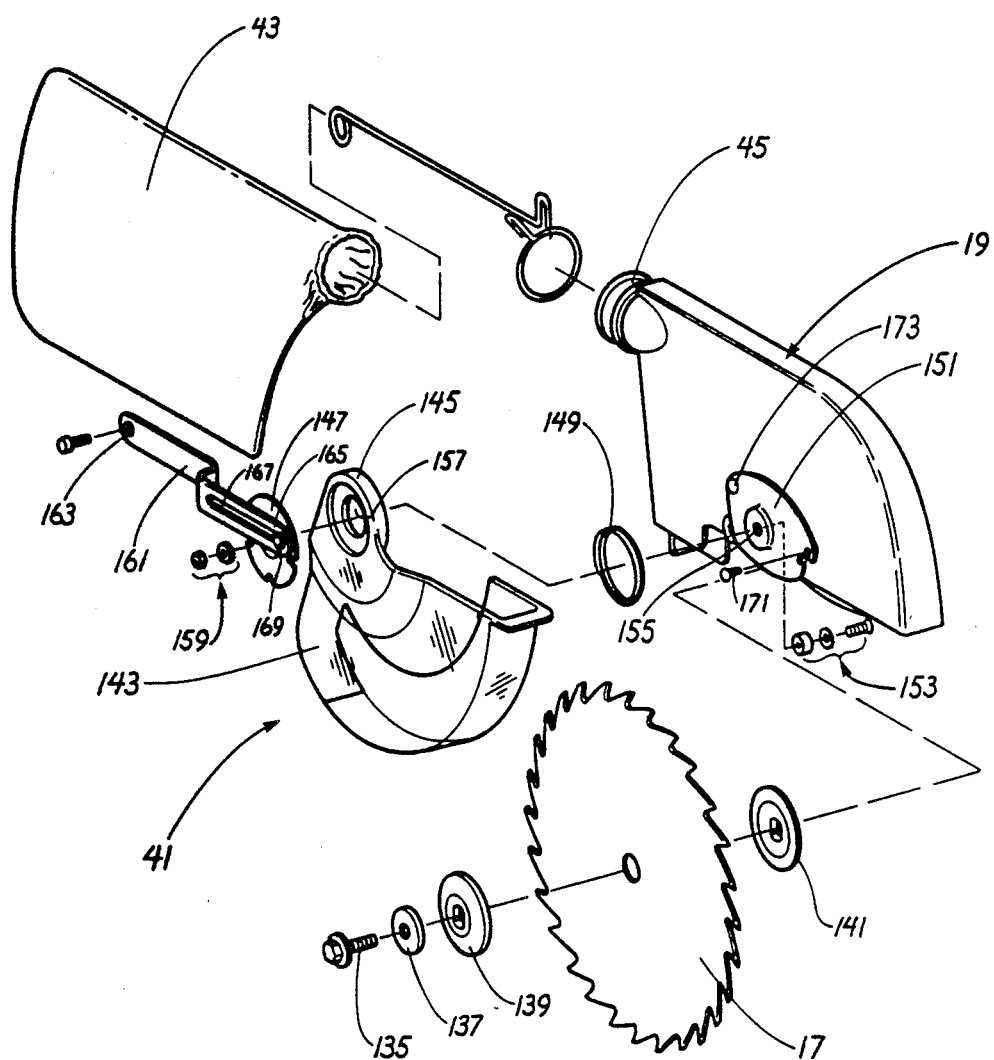
FIG. 12 is an exploded perspective view of the miter saw blade and upper and lower blade guards associated therewith in the compound miter saw of the present invention.

An additional improvement in the present invention relates to the swinging blade guard assembly 41, as will be described in connection with FIGS. 1, 5–6 and 11–12 of the drawings. The swinging blade guard assembly 41 is designed to permit quick and easy removal from the miter saw blade 17 and upper blade guard and housing 19, to facilitate access to the saw blade shaft or arbor screw, 135, shown in FIG. 12 of the drawings, for removing and changing the miter saw blade 17. As shown in FIG. 12, the arbor screw 135 is first mounted through an arbor washer 137, then through an outer blade collar 139, and finally to a threaded opening (not shown) within an extended motor shaft (not shown) for rotating the miter saw blade 17 through the electric motor 21. In the prior art, it has been difficult to provide access to the arbor screw 135 to permit the miter saw blade 17 to be changed and provide a keeper for the arbor screw 135, while not interfering with bevel cutting of the workpiece.

According to the present invention, the pivot center for the swinging blade guard assembly 41, relative to the upper blade guard and housing 19, is eccentrically offset upwards from the saw blade shaft (or arbor screw 135) as well as being eccentrically offset back towards the pivotal mounting of the upper blade guard and housing 19, through the pivot bolt axis 25.

As best seen in the exploded perspective view shown in FIG. 12 of the drawings, the swinging blade guard assembly 41 includes a channel-shaped swinging blade guard 143 preferably formed of transparent plastic material. The swinging blade guard 143 has an integral hub section 145, covered by a plate or cover 147 on one side thereof and a spring 149 on the other captured between the integral hub 145 and a mounting plate 151. The mounting plate 151 is attached to the upper blade guard and housing 19. An assembly of these components together is best seen in FIG. 1 of the drawings.

A threaded fastener 153, having a washer and bushing components associated therewith, extends through the upper blade guard and housing 19, through an aperture 155 in the mounting plate 151 through an aperture 157 in the integral annular boss 145, through an aperture (not shown) in the cover or plate 147, and finally into threaded engagement with the complementary nut 159, having a washer associated therewith. When so assembled together, the upper blade guard 143, as best seen in FIG. 1 and 5 of the drawings has its pivot center along the fastener 153, which is both eccentric upwardly offset and is eccentrically offset also back towards the pivotal mounting 25 of the upper blade guard and housing 19.

The swinging blade guard assembly 41 further includes an actuator arm 161 having one end 163 attached to the cylindrical section 123, and the other end 165 having an elongated slot 167 permitting slideable movement of the fixed pin 169, which is eccentrically mounted to the plate or cover 147. From an at rest position, the swinging blade cover 143 is moved upwardly as the eccentrically mounted slideable pin 169 moves within the elongated slot 167 of the actuator 161. Torsional force of the spring 149, together with the aforementioned eccentric mounting and construction of the components, affords the upward movement of the swinging blade guard 143, as the upper blade guard and housing 19 together with miter saw blade 17, is lowered from an at rest to an operational position.

As can be seen from the above, the swinging blade guard 143 is eccentrically mounted upwards from the arbor screw 135, as well as being eccentrically offset back towards the pivotal mounting 25 for the upper blade guard and housing 19 and miter saw blade 17. In addition, the swinging blade guard 143 includes an actuator arm 161, which is eccentrically offset from the pivot center 153–159 of the swinging blade guard, as the result of the eccentrically mounted pin 169 being attached to the plate or cover 147, and being slideably received within the elongated slot 167 of the actuator 161.

Figure 6:
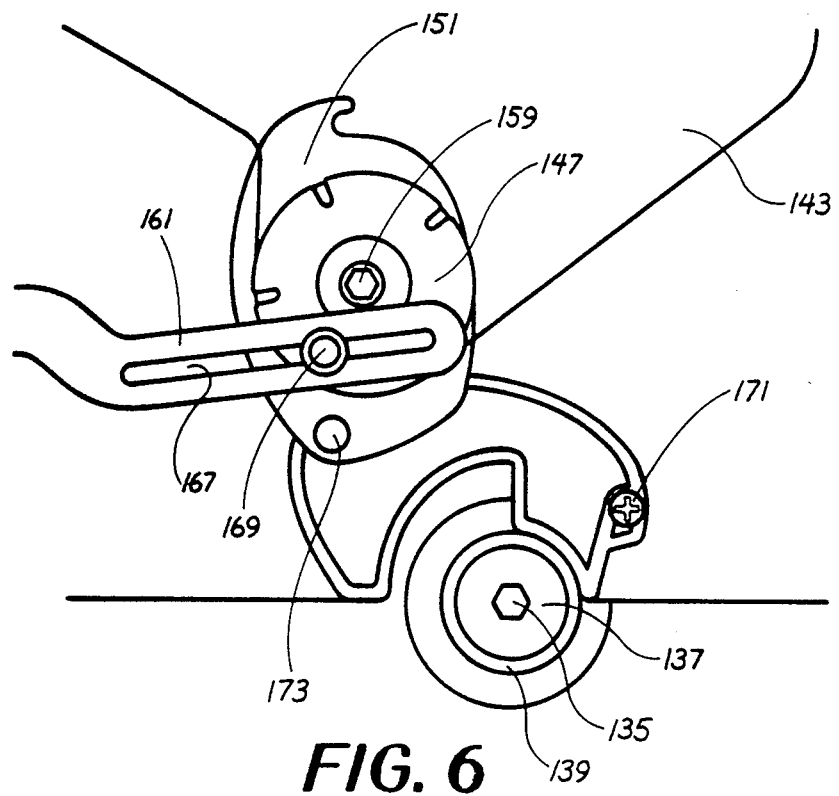
FIG. 6 is an enlarged fragmentary side elevational view illustrating removal of the lower swinging blade guard for access to the shaft of the compound miter saw blade.

Reference is now made to FIG. 6 of the drawings for a description of the manner in which the components of the swinging blade guard assembly 41 are quickly and easily moved out of the way to facilitate access to the arbor screw 135, for changing the miter saw blade 17. Specifically, it will be seen that the threaded fastener 171, assists in securing the mounting plate 151 to the upper blade guard and housing 19, but may be loosened to enable the mounting plate 151 to be rotated or pivoted about the rivet or other fastener 173 securing the mounting plate 151 to the upper blade guard or housing 19. When this occurs, the eccentrically offset pin 169, attached to the cover or plate 147, slideably moves within the elongated slot 167 of the actuator arm towards the pivotal mounting of the upper blade guard and housing 19, as shown in FIG. 6. The swinging blade guard 143 will then be positioned above the upper blade guard and housing 19, leaving both hands free, and enabling quick and open access to the arbor screw 135, for removing or changing the blade 17.

From the foregoing, it will be appreciated that the present invention discloses several improvements in a compound miter saw including alignment of a rotating turntable and associated saw blade slot relative to a movable work supporting fence, the accurate and reliable mounting of the work supporting fence relative to the supporting frame, the combined pivoting movement and bevel adjustment made possible by the closed cylinder constructions, and the ability to move a swinging blade guard quickly and easily out of the way from an upper blade guard and housing to facilitate access to the blade shaft or arbor screw for removing or changing the blade.

In view of the above, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

We claim:

1. In a compound miter saw, a supporting frame, a turntable selectively rotatably mounted on said supporting frame and including a handle and index spring assembly for selectively rotatably positioning said turntable relative to said supporting frame, a power driven saw blade pivotally mounted on said turntable along a predetermined path relative to said turntable, and said turntable having saw blade slot means for receiving the saw blade therein, the improvement comprising: a work supporting fence mounted on said supporting frame and including a pair of work engaging surfaces longitudinally aligned across the saw blade slot means, said work supporting fence including a depending arm extending through said saw blade slot means and being received within an elongated opening in said index spring, to enable said turntable and saw blade slot means to be positioned relative to said power driven saw blade, while said work supporting fence is maintained in alignment relative to said saw blade slot means as the depending arm of said work supporting fence moves within the elongated opening of said index spring.

2. The improvement as defined in claim 1 wherein said saw blade slot means in said turntable includes an elongated slot for receiving said saw blade and a corresponding opening connected to said elongated slot and underlying said work supporting fence.

3. The improvement as defined in claim 2 wherein said work supporting fence has a complementary opening generally vertically aligned with the opening of said saw blade slot means in said turntable.

4. The improvement as defined in claim 3 wherein said supporting frame includes a centrally positioned through opening, and said turntable is provided with a complementary shaped and circumferentially extending depending flange rotatably received within said centrally positioned through opening of said supporting frame.

5. The improvement as defined in claim 4 wherein said handle includes a handle extension underlying said supporting frame and being attached to the circumferentially extending depending flange of said turntable.

6. The improvement as defined in claim 5 wherein said index spring overlies the handle extension and is normally biased into contact with said supporting frame along a peripheral undersurface thereof.

7. The improvement as defined in claim 6 wherein said index spring includes an upwardly extending spring release latch surrounding said supporting frame for releasably disengaging the index spring from contact with the peripheral undersurface of said supporting frame.

8. In a compound miter saw, a supporting frame, a turntable selectively rotatably mounted on said supporting frame, a power driven saw blade pivotally mounted on said turntable along a predetermined path relative to said turntable, and said turntable having saw blade slot means for receiving the saw blade therein, the improvement comprising: a work supporting fence having a bottom surface mounted upon said supporting frame and including a pair of work engaging surfaces longitudinally aligned across the saw blade slot means, said work supporting fence having first angularly offset surfaces on each side of said saw blade slot means which are aligned in generally parallel relationship with second angularly offset surfaces provided in said supporting frame, and clamping means for clamping the first angularly offset surfaces of said work supporting fence relative to the second angularly offset surfaces of said supporting frame.

9. The improvement as defined in claim 8 wherein said supporting frame further is provided with threaded openings in said second angularly offset surfaces which are aligned with passageways provided in said first angularly offset surfaces, and a pair of threaded clamp bolts extending through said passageways of said first angularly offset surfaces and threadably received within the threaded openings of said second angularly offset surfaces, each of said clamp bolts having a clamping surface for engaging and clamping said work supporting fence between the first angularly offset surfaces of said work supporting fence and the second angularly offset surfaces of said supporting frame as said clamp bolts are threaded into the threaded openings of aid second angularly offset surfaces.

10. The improvement as defined in claim 9 wherein the passageways provided in said first angularly offset surfaces are longitudinally elongated passageways enabling longitudinal adjustment of said work supporting fence.

11. The improvement as defined in claim 10 wherein said supporting frame is provided with corresponding front and rear threaded openings on each side of said saw blade slot means for positioning said work supporting fence in front and rear work engaging positions.

12. The improvement as defined in claim 11 wherein the front engaging position is located at the center of the turntable.

13. The improvement as defined in claim 12 wherein the rear engaging position is laterally offset from the center of the turntable, and means are provided to permit side-by-side sliding movement of said work supporting fence relative to said supporting frame during miter adjustment and positioning of said saw blade relative to said supporting frame.

14. The improvement as defined in claim 13 wherein the first and second angularly offset surfaces are each 30° offset from the bottom surface of the work supporting fence.

15. In a compound miter saw pivotally mounted on a supporting frame between an operational position, when lowered, and a rest position, when raised, and having a motor driven saw blade rotatably mounted on a shaft, a housing partially encasing the saw blade, and a swinging blade guard arranged to cover an exposed area of the saw blade when in its rest position, the improvement comprising: said swinging blade guard having a pivot center on said housing which is eccentrically offset upwards from the saw blade shaft and backwards toward the pivotal mounting of said compound miter saw, the eccentrically offset pivot center of said swinging blade guard being located on a detachable mounting plate that also pivots on said housing on a second eccentrically offset pivot center when detached at one end from said housing, to facilitate access to the saw blade shaft without substracting from workpiece capacity when the compound miter saw is used in miter or bevel operations.

16. The improvement as defined in claim 15 wherein said swinging blade guard includes an actuator arm which is eccentrically offset from the pivot center of the swinging blade guard.

17. The improvement as defined in claim 16 wherein said actuator arm includes an elongated slot extending from one end thereof for operative engagement with the eccentrically offset pivot center of the swinging blade guard.

18. The improvement as defined in claim 17 wherein said actuator arm is mounted at its other end to said supporting frame.

19. The improvement as defined in claim 18 wherein coil spring means are provided between said swinging blade guard and said detachable mounting plate for normally resiliently biasing said swinging blade guard to cover said exposed area of the saw blade when in its at rest position.

20. In a compound miter saw, a supporting frame, a turntable selectively rotatably mounted on said supporting frame for selective miter adjustment, a saw blade being pivotally mounted on said turntable for movement between an operational position, when lowered, and an at rest position, when raised, said saw blade also being pivotally mounted on said turntable for bevel pivot adjustment in a direction generally transverse to the pivotal movement of said saw blade between operational and at rest positions, the improvement comprising: first and second closed cylinders extending transversely relative to one another and having transversely extending axes, said first and second transversely extending closed cylinders being positioned between said supporting frame and said saw blade, the first closed cylinder including means for the pivot movement of said saw blade between operational and at rest positions, and said second closed cylinder including means for the bevel pivot adjustment of said saw blade relative to said turntable.

21. The improvement as defined in claim 20 wherein said first and second transversely extending closed cylinders such include fixed and moving cylinder sections enabling said aforementioned movements.

22. The improvement as defined in claim 21 wherein said first and second transversely extending closed cylinders are integrally joined and fixed to one another across one of the fixed and moving cylinder sections thereof.

23. The improvement as defined in claim 22 wherein the fixed cylinder section of the first closed cylinder, during the pivotal movement of said saw between operational and at rest positions, is integrally joined to the moving cylinder section of the second closed cylinder for movement therewith during the bevel pivot adjustment of said saw relative to said turntable.

24. A compound miter saw comprising: a supporting frame, a turntable selectively rotatably mounted on said supporting frame and including a handle and index spring assembly for selectively rotatably positioning said turntable relative to said supporting frame, a power driven saw blade pivotally mounted on said turntable along a predetermined path relative to said turntable, said turntable having saw blade slot means for receiving the saw blade therein, a work supporting fence mounted on said supporting frame and including a pair of work engaging surfaces longitudinally aligned across the saw blade slot means, said supporting frame including a depending arm extending through said saw blade slot means and being received within an elongated opening in said index spring, to enable said turntable and said saw blade slot means to be positioned relative to said power driven saw blade, while said work supporting fence is maintained in alignment relative to said saw blade slot means as the depending arm of said work supporting fence moves within the elongated opening of said index spring, said saw blade slot means in said turntable including an elongated slot for receiving said saw blade and a corresponding opening connected to said elongated slot and underlying said work supporting fence, and said work supporting fence having a complementary opening generally vertically aligned with the opening of the saw blade slot means in said turn table.

25. A compound miter saw comprising: a supporting frame, a turntable selectively rotatably mounted on said supporting frame, a power driven saw blade pivotally mounted on said turntable along a predetermined path relative to said turntable, and said turntable having saw blade slot means for receiving the saw blade therein, a work supporting fence having a bottom surface mounted upon said supporting frame and including a pair of work engaging surfaces longitudinally aligned across the saw blade slot means, said work supporting fence having first angularly offset surfaces on each side of said saw blade slot means which are aligned in generally parallel relationship with second angularly offset surfaces provided in said supporting frame, said work supporting fence further being provided with threaded openings in said second angularly offset surfaces which are aligned with passageways provided in said first angularly offset surfaces, and a pair of threaded clamp bolts extending through said passageways of said first angularly offset surfaces and threadably received within the threaded openings of said second angularly offset surfaces, each of said clamp bolts having a clamping surface for engaging and clamping said work supporting fence between the first angularly offset surfaces of said work supporting fence and the second angularly offset surfaces of said supporting frame as said clamp bolts are threaded into the threaded openings of said second angularly offset surfaces.

26. A compound miter saw comprising: a supporting frame, a turntable selectively rotatably mounted on said supporting frame and including a handle and index spring assembly for selectively rotatably positioning said turntable relative to said supporting frame, a power driven saw blade pivotally mounted on said turntable along a predetermined path relative to said turntable, said turntable having saw blade slot means for receiving the saw therein, a work supporting fence mounted on said supporting frame and including a pair of work engaging surfaces longitudinally aligned across the saw blade slot means, said work supporting fence including a depending arm extending through said saw blade slot means and being received within an elongated opening in said index spring, and said work supporting fence having first angularly offset surfaces on each side of said saw blade slot means which are aligned in generally parallel relationship with second angularly offset surfaces provided in said supporting frame, and clamping means for clamping the first angularly offset surfaces of said work supporting fence relative to the second angularly offset surfaces of said supporting frame.

27. A compound miter saw, said saw being pivotally mounted on a supporting frame between an operational position, when lowered, and a rest position, when raised, said pivotally mounted saw including a motor driven saw blade rotatably mounted on a shaft, a housing partially encasing the saw blade, a swinging blade guard arranged to cover an exposed area of the saw blade when in its rest position, said swinging blade guard having a pivot center on said housing which is eccentrically offset upwards from the saw blade shaft and backwards toward the pivotal mounting of said compound miter saw, the eccentrically offset pivot center of said swinging blade guard being located on a detachable mounting plate that also pivots on said housing on a second eccentrically offset pivot center when detached at one end from said housing, and said swinging blade guard including an actuator arm which is eccentrically offset from the pivot center of the swinging blade guard, whereby to facilitate access to the saw blade shaft.

28. A compound miter saw comprising: a supporting frame, a turntable selectively rotatably mounted on said supporting frame for selective miter adjustment, a saw blade being pivotally mounted on said turntable for movement between an operational position when lowered, and an at rest position, when raised, said saw blade also being pivotally mounted on said turntable for bevel pivot adjustment in a direction generally transverse to the pivotal movement of said saw blade between operational and at rest positions, first and second closed cylinders extending transversely relative to one another and having transversely extending axes, said first and second transversely extending closed cylinders being positioned between said supporting frame and said saw blade, the first closed cylinder including fixed and movable cylinder sections for pivotal movement of said saw blade between operational and at rest positions, and said second closed cylinder including fixed and movable cylinder sections for bevel pivot adjustment of said saw blade relative to said turntable, and said first and second transversely extending closed cylinder sections being integrally joined and fixed to one another across one of the fixed and movable cylinder sections between said first and second transversely extending closed cylinders.

* * * * *

REEXAMINATION CERTIFICATE (2359th)
United States Patent [19]

Brundage et al.

[11] B1 4,934,233

[45] Certificate Issued Aug. 23, 1994

[54] COMPOUND MITER SAW

[75] Inventors: Richard B. Brundage; Richard L. Mitchell, both of St. Louis, Mo.

[73] Assignee: Emerson Electric Co., St. Louis, Mo.

Reexamination Requests:
No. 90/002,522, Nov. 27, 1991
No. 90/002,992, Feb. 23, 1993

Reexamination Certificate for:
Patent No.: 4,934,233
Issued: Jun. 19, 1990
Appl. No.: 213,277
Filed: Jun. 29, 1988

[51] Int. Cl.$^5$ .................... B23D 45/14; B27B 5/20
[52] U.S. Cl. ..................... 83/397; 83/468.3; 83/468.7; 83/471.3; 83/478; 83/490; 83/581; 83/522.18
[58] Field of Search ............ 83/397, 468.3, 468.7, 83/471.3, 478, 490, 581, 473, 477.2, 522.18

[56] References Cited

U.S. PATENT DOCUMENTS

| | | | |
|---|---|---|---|
| D. 282,346 | 4/1986 | Pioch | D8/66 |
| 4,011,782 | 3/1977 | Clark et al. | 83/471.3 |
| 4,581,966 | 4/1986 | Kaiser et al. | 83/397 |
| 4,694,720 | 9/1987 | Brickner et al. | 83/471.3 |

*Primary Examiner*—Eugenia A. Jones

[57] ABSTRACT

In a compound miter saw or the like having a selectively rotatable turntable mounted on a supporting frame and a power driven saw blade pivotally mounted on the turntable between a lowered full cut position and a raised full retract position, the improvements comprising a work supporting fence that is maintained in alignment with a turntable slot while the turntable, including associated saw blade slot, is positioned for desired miter cuts; and the work supporting fence also being accurately and effectively clamped relative to the supporting frame, in both front and rear work supporting fence positions. Additional improvements include a swinging blade guard for the power driven saw blade having a pivot center eccentrically offset upwards from the shaft on which the saw blade rotates and back toward the pivotal mounting of the saw on the turntable, to facilitate access to the saw blade shaft and precludes interference with bevel cuts; and first and second transversely extending closed cylinders between the turntable and the saw, enabling pivotal movement of the saw between full cut and full retract positions, while also permitting bevel pivotal adjustment of the saw relative to the turntable.

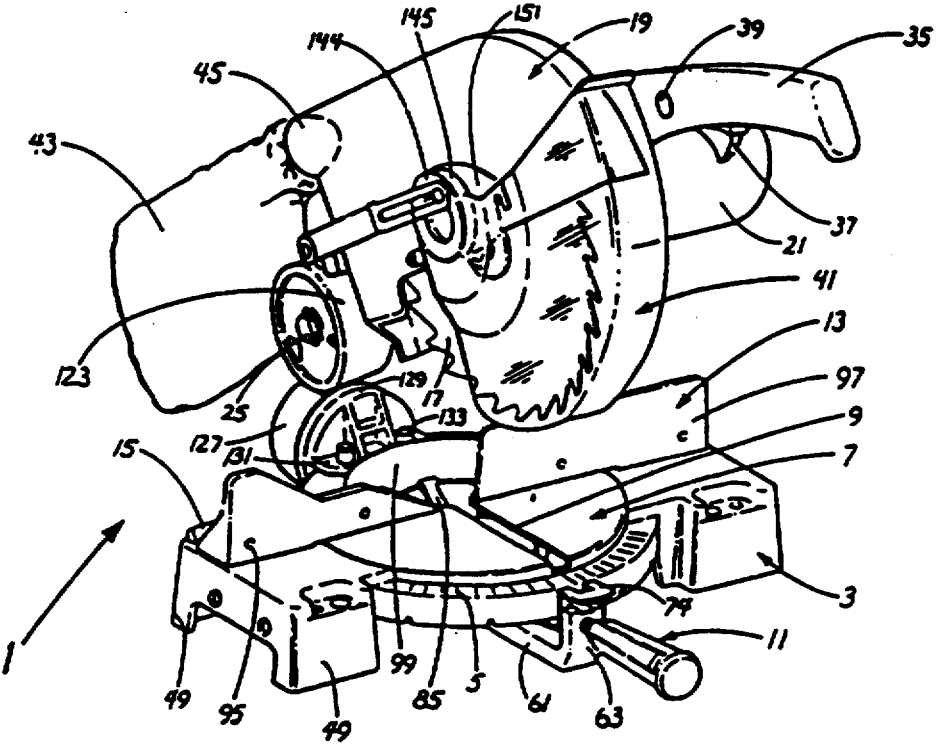

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-19 and 24-27 is confirmed.

Claims 20-23 and 28 are determined to be patentable as amended.

20. In a compound miter saw, a supporting frame, a turntable selectively rotatably mounted on said supporting frame for selective miter adjustment, a saw blade being pivotally mounted on said turntable for movement between an operational position, when lowered, and an at rest position, when raised, said saw blade also being pivotally mounted on said turntable for bevel pivot adjustment in a direction generally transverse to the pivotal movement of said saw blade between operational and at rest positions, the improvement comprising: first and second *vertically juxtaposed* closed cylinders extending transversely relative to one another and having transversely extending axes, *said first and second transversely extending closed cylinders being directly and integrally attached to one another along outer cylindrical marginal surfaces of said closed cylinders while also being positioned between said supporting frame and said saw blade,* the first closed cylinder including means for the pivot movement of said saw blade between operational and at rest positions, [and] said second closed cylinder *located immediately below said first closed cylinder and* including means for the bevel pivot adjustment of said saw blade relative to said turntable, *miter measuring means associated with said turntable, and bevel measuring means mounted on said means included in said second closed cylinder for the bevel pivot adjustment of said saw blade relative to said turntable.*

21. The improvement as defined in claim 20 wherein said first and second transversely extending closed cylinders [such] include *laterally extending* fixed and moving *side-by-side* cylinder sections enabling said aforementioned movements.

22. The improvement as defined in claim 21 wherein said first and second transversely extending *and directly attached* closed cylinders are integrally [joined] *interconnected* and fixed to one another across one of the *laterally extending* fixed and moving *side-by-side* cylinder sections thereof *along the outer cylindrical marginal surfaces of said closed cylinders.*

23. The improvement as defined in claim 22 wherein the fixed cylinder section of the first closed cylinder, during the pivotal movement of said saw between operational and at rest positions, is integrally [joined] *interconnected* to the moving cylinder section of the second closed cylinder for movement therewith during the bevel pivot adjustment of said saw *blade* relative to said turntable.

28. A compound miter saw comprising: a supporting frame, a turntable selectively rotatably mounted on said supporting frame for selective miter adjustment, a saw blade being pivotally mounted on said turntable for movement between an operational position when lowered, and an at rest position, when raised, said saw blade also being pivotally mounted on said turntable for bevel pivot adjustment in a direction generally transverse to the pivotal movement of said saw blade between operational and at rest positions, first and second *vertically juxtaposed* closed cylinders *mounted immediately above and below each other and* extending transversely relative to one another and having transversely extending axes, said first and second *vertically juxtaposed and* transversely extending closed cylinders *being directly and integrally attached to one another along outer cylindrical marginal surfaces of said closed cylinders while also* being positioned between said supporting frame and said saw blade, the first closed cylinder including *laterally extending* fixed and movable *side-by-side* cylinder sections for pivotal movement of said saw blade between operational and at rest positions, and said second closed cylinder *located immediately below said first closed cylinder and* including *laterally extending* fixed and movable *side-by-side* cylinder sections for bevel pivot adjustment of said saw blade relative to said turntable, [and] said first and second transversely extending closed [cylinder sections] *cylinders* being integrally joined and fixed to one another across one of the *laterally extending* fixed and movable *side-by-side* cylinder sections between said first and second transversely extending *and directly attached* closed cylinders *along the outer cylindrical marginal surfaces thereof,* miter measuring means associated with said turntable, and bevel measuring means mounted on the *laterally extending fixed and movable side-by-side cylinder sections of said second closed cylinder.*

* * * * *